US008285612B2

(12) United States Patent
Abdelfattah et al.

(10) Patent No.: US 8,285,612 B2
(45) Date of Patent: Oct. 9, 2012

(54) SYSTEMS AND METHODS FOR DATA PROCESSING

(75) Inventors: Chalbia Abdelfattah, Walldorf (DE); Juergen Abt, Rauenberg (DE); Dirk Becker, Malsch (DE); Roger F. Gutbrod, Sandhausen (DE); Rolf W. Haas, Schramberg (DE); Juan Puga Ortiz, Rome (IT); Martin Schroter, Bad Schoenborn (DE); Stefan Ufer, Mannheim (DE); Joerg Wegener, Nussloch (DE); Burkhard H. Weiss, Wiesloch (DE)

(73) Assignee: SAP AG, Walldorf (DE)

( * ) Notice: Subject to any disclaimer, the term of this patent is extended or adjusted under 35 U.S.C. 154(b) by 934 days.

(21) Appl. No.: 11/290,434

(22) Filed: Dec. 1, 2005

(65) Prior Publication Data

US 2006/0178958 A1    Aug. 10, 2006

Related U.S. Application Data

(60) Provisional application No. 60/631,891, filed on Dec. 1, 2004.

(30) Foreign Application Priority Data

Sep. 16, 2005   (EP) ................................ 05108548

(51) Int. Cl.
*G06Q 40/00* (2012.01)
(52) U.S. Cl. .......................................... 705/35; 705/40
(58) Field of Classification Search .............. 705/35, 705/40
See application file for complete search history.

(56) References Cited

U.S. PATENT DOCUMENTS

| 6,026,238 | A  | * | 2/2000 | Bond et al. .................. 717/141 |
| 6,757,689 | B2 |   | 6/2004 | Battas et al. |
| 7,171,401 | B2 | * | 1/2007 | Tanaka .......................... 707/3 |
| 7,236,950 | B2 |   | 6/2007 | Savage et al. |
| 2003/0033218 | A1 | * | 2/2003 | Flaxer et al. ................. 705/27 |

(Continued)

FOREIGN PATENT DOCUMENTS

EP   1482418 A1   12/2004

OTHER PUBLICATIONS

Communication and Search Report from the European Patent Office, dated Nov. 11, 2005 (5 pages).

(Continued)

*Primary Examiner* — Thomas Dixon
*Assistant Examiner* — Benjamin S Fields
(74) *Attorney, Agent, or Firm* — Finnegan, Henderson, Farabow, Garrett & Dunner, LLP

(57) ABSTRACT

Systems and methods are provided for data processing. In one implementation, a data processing system includes storage means for storing sets of account identifiers, each of the sets of account identifiers being assigned a set of control parameters. The data processing system may also include an account management system that stores account data of accounts that are identified by the account identifiers, interface means coupled to the account management system, and one or more sets of application programs that are adapted to process account data of accounts identified by at least one of the one or more sets of account identifiers using the set of control parameters assigned to the at least one of the one or more sets of account identifiers. The interface means may obtain the account data from the account management system on request of one of the application programs.

13 Claims, 7 Drawing Sheets

U.S. PATENT DOCUMENTS

| | | |
|---|---|---|
| 2003/0216964 A1 | 11/2003 | MacLean et al. |
| 2004/0158480 A1* | 8/2004 | Lubars et al. ............... 705/1 |
| 2004/0177036 A1* | 9/2004 | Nutahara et al. ............ 705/39 |
| 2004/0254824 A1 | 12/2004 | Loucaides et al. |
| 2005/0044017 A1* | 2/2005 | Foss et al. ................ 705/30 |
| 2005/0071177 A1 | 3/2005 | Berger |
| 2005/0246269 A1 | 11/2005 | Smith |
| 2006/0059085 A1* | 3/2006 | Tucker ....................... 705/38 |
| 2006/0155568 A1 | 7/2006 | Weiss et al. |
| 2006/0282637 A1 | 12/2006 | Yamauchi et al. |
| 2007/0038561 A1 | 2/2007 | Vancini et al. |
| 2007/0106558 A1* | 5/2007 | Mitchell et al. ............. 705/16 |

OTHER PUBLICATIONS

Communication and Search Report from the European Patent Office for EP Application No. 05005941.9, dated Jul. 27, 2005, 7 pages.

* cited by examiner

Account Identifier Set i

| Account Identifier | Control Parameter | | | | |
|---|---|---|---|---|---|
| | sub-set (A1) | | | sub-set (A2) | ... |
| | Funded | Funding | Priority | | |
| $a_{i1}$ | x | $a_{ij}$ | 1 | | |
| ... | ... | ... | ... | | |
| $a_{ij}$ | $a_{i1}$ | x | 1 | | |
| ... | ... | ... | ... | | |

Account independent
Control Paramenter

Fig. 3

SYSTEMS AND METHODS FOR DATA PROCESSING

CROSS-REFERENCE TO RELATED APPLICATION(S)

This application is based upon and claims the benefit of priority from U.S. Provisional Patent Application No. 60/631,891, filed Dec. 1, 2004, and European Patent Application No. EP 05108548.8, filed Sep. 16, 2005. The entire contents of each are expressly incorporated herein by reference to their entireties.

BACKGROUND

I. Technical Field

The present invention generally relates to software and the field of data processing. More particularly, the invention relates to financial and banking data processing systems and methods.

II. Background Information

In today's information intensive environment, financial and banking products and services often require complex data processing functionalities. Legacy account management systems are typically unable to provide such complex data processing functionalities. As a result, the provision of complex data processing functionalities by account management systems requires additional programming work that is costly, inefficient, and difficult to maintain. Alternatively, to provide complex data processing functionalities, a legacy replacement account management system may be replaced by a new system that provides the required complex functionalities. However, in either alternative, a large expense is incurred that may result efficiencies. There is, therefore, a need to facilitate usage of legacy account management systems for complex data processing functionalities.

SUMMARY

In accordance with embodiments of the present invention, a data processing system is provided comprising: storage means for storing sets of account identifiers, each set of account identifiers having assigned thereto a set of control parameters; interface means for coupling to at least one account management system, the account management system storing account data of accounts that are identified by the account identifiers; and a set of application programs, each application program being adapted for processing the account data of accounts identified by at least one of the sets of the account identifiers using the control parameters assigned to the at least one of the sets of account identifiers. In one embodiment, the interface means is adapted to obtain the account data from the account management system on request of one of the application programs of the set of application programs.

Embodiments consistent with the present invention may facilitate the implementation of complex data processing functionalities, while allowing usage of legacy account management systems. This may be accomplished by using one or more account management systems for performing elementary transactions, such as the provision of account data and the execution of requested postings, while the more complex data processing logic may be implemented in an additional data processing system that is coupled to the account management system.

In accordance with an embodiment of the invention, a data processing system includes an application program for overdraft protection of accounts. Some banks offer their customers checking account products that do not allow overdrawing; this is common practice in the U.S. banking industry. Partial-day overdrafts are allowed, but the account must have a positive balance at the end of the posting day after all items from payment transactions are posted to the account. If the account is overdrawn at the end of the day, the bank usually tries to return debits, e.g. checks, until the account has a positive balance. However, the bank customer is debited with a service charge for such returns. Such returns can also have a negative influence on a customer's credit score.

Embodiments consistent with the present invention may provide an overdraft protection functionality, such as for a checking account. For example, if there is an overdraft of a checking account at the end of a posting day, money is transferred to the checking account from other accounts belonging to the same customer or another customer to increase the balance to a position that covers the posting items. The accounts from which the money is transferred for protection against an overdraft are referred to as "funding accounts" whereas the overdraft protected account is referred to as the "funded account." For example, a checking account, savings account, or credit card account can serve as a funding account. A funding account can be a funded account with respect to another account of the same or another customer.

Embodiments of the present invention may provide complex functionality for bundle pricing of services. Bundle pricing of services is of interest for the banking and telecommunication industries. For example, a telecommunication customer is charged with telecommunication fees for various telecommunication services, such as voice communication, data communication, the use of pre-paid and post-paid services, and/or the transmitted data volume. The customer receives a rebate for the telecommunication services depending on the amount of usage of the various telecommunication services. The amount of the rebate is calculated by one of the application programs. Bundle pricing is also commonly used in retail banking. A bank's customer obtains a rebate for bank fees, such as fees for account maintenance, inter-account transfers, debit orders, electronic account payments, cash withdrawals and/or interest rates, when a certain condition is fulfilled, such as when one of the accounts of the customer exceeds a defined threshold balance. For example, the defined threshold balance can be stored as one of the control parameters.

Embodiments consistent with the present invention may also provide functionality for payment distribution and monitoring (PDM). For example, funds that are available on a specified account may be distributed to other accounts in accordance with a customer specific distribution plan. The distribution of the funds to various accounts may be specified by control parameters.

One of ordinary skill in the art will recognize that embodiments of the present invention are not limited to processing of account information and account identifiers, but that other kinds of data can be taken into account. For example, insurance information and information regarding a customer's securities, such as collaterals, may be combined with the accounts information for the various data processing functionalities. This may be accomplished by coupling one or more contract management systems to the data processing system and/or by using an account management system that can also be used for contract management purposes. In this instance, a contract identifier may be used rather than an account identifier.

In accordance with an embodiment of the invention, various data processing functionalities serve for the implementation of respective business processes. For example, there may be a one to one relationship of application programs and business processes.

In accordance with an embodiment of the invention, a concept of master contracts may be used. In one implementation, there may be a one to one relationship between customers and master contracts, i.e. each customer has one single master contract. However, each customer can have more than one master contract and/or a number of customers can have a common master contract. Furthermore, the accounts and contracts that are assigned to a master contract may belong to different customers. As a practical matter, a bank will usually define certain organizational rules that limit this flexibility. For example, a funding account of a master contract typically belongs to the same customer as the master contract whereas the funded account can belong to an arbitrary customer.

In accordance with an embodiment of the invention, two types of control parameters may be used. The first type of control parameter may relate to an application program with respect to a specific business process, such as the contracting partner, validity periods, priorities, next due date, periodicity of the mass run, etc. This first type of control parameter is set specific, i.e. it is specific to a set of account identifiers or a master contract relative to an application program. A second type of control parameter may be specific to an account within a set relative to an application program. In addition, the control parameter can specify the role of an account. For example, for the purpose of overdraft protection (ODP) the roles are "funded account" or "funding account." For PDM, a possible role is "clearing account." For bundle pricing, a possible role is the reference account to which a rebate determined by the bundle pricing is to be posted.

In accordance with an embodiment of the invention, a global parameter for a master contract or set can specify the next due date for the performance of an application program or business process with respect to a certain set. In this example, the mass activity selects only those master contracts or sets that are due for processing. After performance of the mass activity, the due date for performing the next mass activity is updated automatically. This reflects an agreement between the bank and its customer as it is set forth in the master contract or frame contract with the customer. The agreement with the customer can also encompass the periodicity of the mass activity runs.

In accordance with an embodiment of the invention, priorities may be defined for the purpose of ODP. There may be two different kinds of priorities: the first priority may specify a priority with which a master contract is selected for the purpose of performing a mass activity and the second priority may specify a sequence of the processing during the mass activity within the selected set of master contracts. For example, for performance of a mass activity run, all master contracts having the highest first, global priorities may be selected. Processing of the selected master contracts having the same global priority may begin with the master contracts within this selected set that have the highest second type of priority that specifies the order of the processing within the mass activity run. This second priority specifies an order in which access is made to funding accounts.

In accordance with an embodiment of the invention, a data processing system includes a visualization tool for visualizing the relationships that have been defined between accounts. For example, the visualization tool generates a diagram that shows a customer's accounts and the relationships between the customer's accounts and accounts of other customers, if any. For example, the diagram shows the relationships between funded and funding accounts. The priority of the relationship may be also displayed.

Embodiments of the present invention also relate to data processing methods. In one embodiment, the data processing method comprises: selecting at least one set of account identifiers from a plurality of sets of account identifiers, each set of account identifiers having assigned thereto a set of control parameters; selecting at least one application program of a set of application programs for processing the selected sets of account identifiers; requesting account data of accounts being identified by the account identifiers of the selected sets of account identifiers from at least one account management system; processing the account data in accordance with the control parameters assigned to the account identifiers of the selected sets of account identifiers in order to generate posting requests; and transmitting the posting requests to the at least one account management system.

In still another aspect, embodiments consistent with the present invention may store program instructions for performing the above methodologies as a computer program product, such as a digital storage medium, comprising computer executable instructions for performing the methods.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 3 is a diagram illustrating exemplary control parameters assigned to account identifiers for overdraft protection;

DESCRIPTION OF THE EMBODIMENTS

Figure 1:
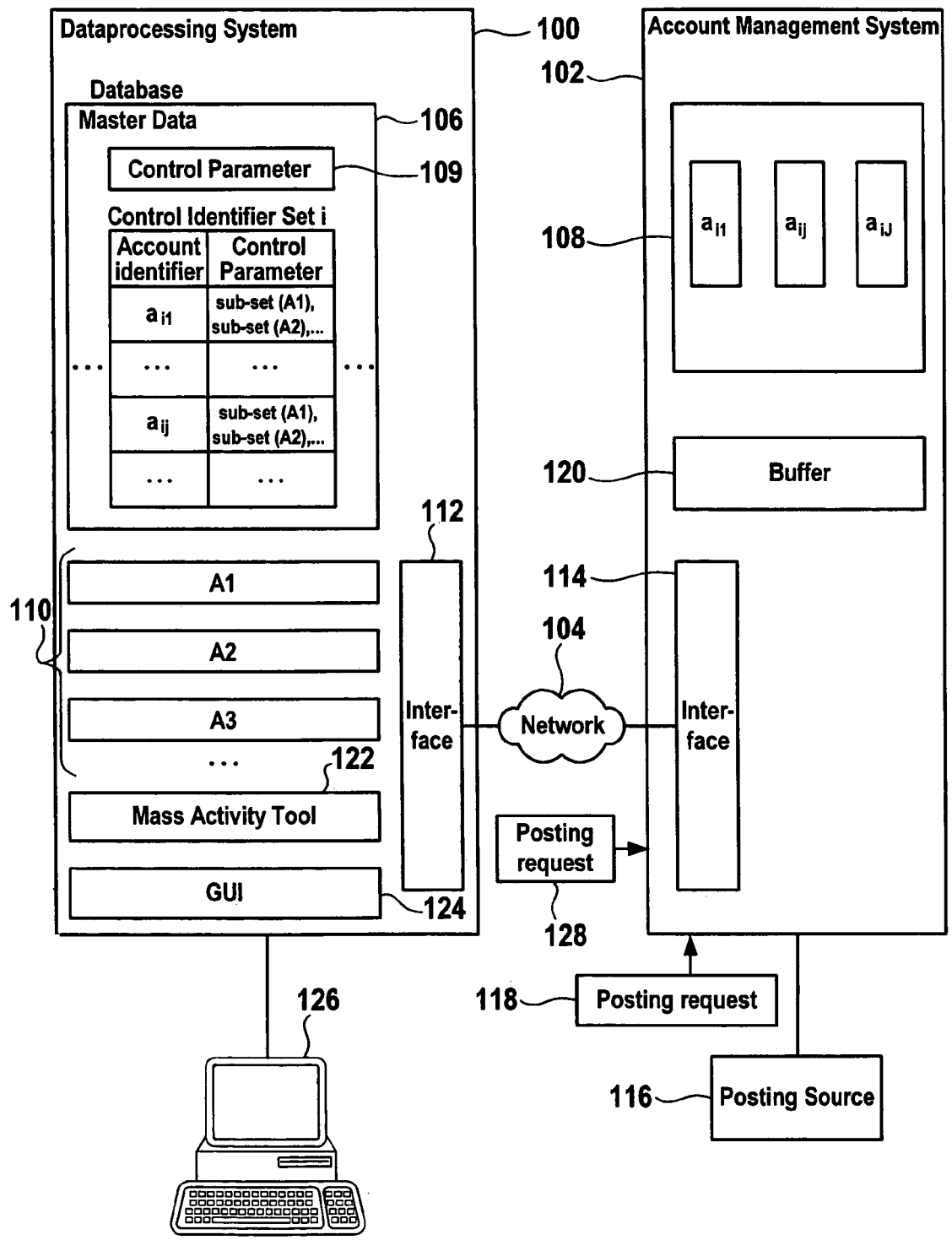
FIG. 1 is a block diagram of an exemplary data processing system that is coupled to an account management system, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 shows an exemplary data processing system 100 that is coupled to at least one account management system 102 via a network 104. The data processing system 100 includes a database 106 for storing master data. The master data may comprise sets of account identifiers, such as the account identifier set i. The account identifier set i is related to a respective customer i. The account identifier set i comprises the account identifiers $a_{i1}, \ldots, a_{ij}, \ldots a_{i,J}$ of that customer i. The respective account data is maintained by the account management system 102 in its database 108.

The account identifier set may comprise first and second types of control parameters for the account identifiers contained in the account identifier set i. The first type of control parameters 109 relates to an application program with respect to a specific business process, such as the contracting partner, validity periods, priorities, next due date, periodicity of the mass run, etc. This first type of control parameter is set specific, i.e. it may be specific to a set of account identifiers, such as a master contract that is relative to an application program. For example, the first type of control parameters may specify application specific due dates for including the respective set of account identifiers in a mass run for performing that application program. The second type of control parameter may be specific to an account within a set relative to an application program.

In one embodiment, data processing system 100 comprises a set 110 of application programs 110, as shown in FIG. 1. The set of application programs 110 may include an application program A1 that provides an overdraft protection functionality, an application program A2 that provides a bundle pricing functionality, an application program A3 that provides a payment distribution and monitoring (PDM) functionality, and/or various other applications programs. The account identifier set i may include a sub-set of control parameters for controlling the overdraft protection functionality provided by the application program A1, a sub-set of control parameters for controlling the bundle pricing functionality provided by the application program A2, a sub-set of control parameters for controlling the PDM functionality provided by the application program A3.

An interface 112 couples data processing system 100 to network 104. The account management system 102 has a corresponding interface 114 for coupling account management system 102 to network 104. Interface 112 and interface 114 implement a protocol for the exchange of information between the data processing system 100 and account management system 102 to provide account data from account management system 102 to data processing system 100 and posting requests 128 from data processing system 100 to account management system 102. Interfaces 112 and 114 and network 104 may, for example, implement SAP's exchange infrastructure (XI).

For the purpose of overdraft protection (ODP), account management system 102 may support the identification of problematic accounts that require ODP processing. The identification of such problematic accounts can be performed in various ways, such as by starting the application program A1 for all due account identifier sets by the data processing system 100 and/or it can be performed by buffering posting requests involving such problematic accounts by the account management system 102. In the first case, account management system 102 may be queried by the data processing system for determination of any problematic funded accounts that requires the overdraft protection processing. In the latter case, the content of the buffer is reported from account management system 102 to data processing system 100 for ODP processing. Furthermore, the next due date for the processing may be updated after the ODP run in both cases.

For ODP processing, account management system 102 may report the problematic funded accounts to data processing system 102. Data processing system 102 may determine a sub-set of these reported accounts that are included in one of the account identifier sets, such as master contracts, that are due for ODP processing in accordance with the respective control parameter. For the account identifier sets of the sub-set the ODP run is performed.

As another possibility for ODP processing, data processing system 100 may determine the sets of account identifiers (master contracts) for which the OPD run is to be performed. This can be all sets of account identifiers or only those that are due for processing in accordance with the respective control parameter. The funded accounts are identified in the determined set of account identifiers. Next, data processing system 100 queries account management system 102 to determine which of the identified funded accounts are problematic. Data processing system 100 performs the ODP processing for those of the sets of account identifiers that include such a problematic account.

Account management system 102 may be coupled to one or more posting sources 116. For example, posting source 116 may send a posting request 118 to account management system 102 when a check is received or another financial transaction is to be posted by account management system 102. Posting requests 118 received from the at least one posting source 116 during a posting day may be buffered in buffer memory 120 of account management system 102. At the end of the posting day, posting requests 118 contained in buffer memory 120 are "hard" posted on the account by account management system 102.

Data processing system 100 may include a mass activity tool 122 for parallelized execution of mass activities by a selected one of the application programs. Furthermore, data processing system 100 may include a graphical user interface 124 for a user's interaction with data processing system 100 by means of a personal computer 126 that is coupled to data processing system 100.

In operation, account management system 102 receives posting requests 118 during a posting day. At the end of the posting day and, before posting requests 108 that are buffered in buffer memory 120 are hard posted in the accounts held by database 108, application program A1 is initiated to perform an overdraft protection run. The overdraft protection run may be scheduled by means of mass activity tool 122.

Application program A1 may generate posting requests 128 for transferring money from one or more funding accounts to funded accounts, if required for overdraft protection. Posting requests 128 may be sent to account management system 102 from interface 112. After posting requests 128 that have been generated by application program A1 are executed by account management system 102, posting requests 118 stored in the buffer memory 120 may be processed. Due to the previously executed posting requests 128 of application program A1, overdrafts that would otherwise have occurred are prevented.

A bundle pricing mass activity may also be scheduled using mass activity tool 122. For bundle pricing application program A2, the account identifier set i may include a sub-set of control parameters that specify the bundle pricing conditions for a given customer i. For performance of bundle pricing, application program A2 may request account data from account management system 102 to determine transactions for which fees may be charged and any rebates that may be given to the customer i in accordance to the control parameters contained in the sub-set. Furthermore, payment distribution and monitoring may be performed by means of application program A3 using the respective sub-set of control parameters contained in the account identifier set i.

Data processing system 100 is particularly advantageous as it can implement complex data processing functionalities using legacy account management system 102. Legacy account management system 102 does only need to provide elementary functionalities such as execution of a requested posting, buffering of requested postings received from a posting source, and providing account data to data processing system 100. Furthermore, a higher level of business logic may be implemented in data processing system 100 and may not be implemented in account management system 102 to enable continued operation of legacy account management system 102 despite the introduction of advanced account features and business models.

More than one account management system may be coupled to data processing system 100. In such an embodiment, each account identifier may include an assigned additional identifier for identification of the account management system that holds the account data of that account. For example, these assignments may be stored in interface 112.

Figure 2:
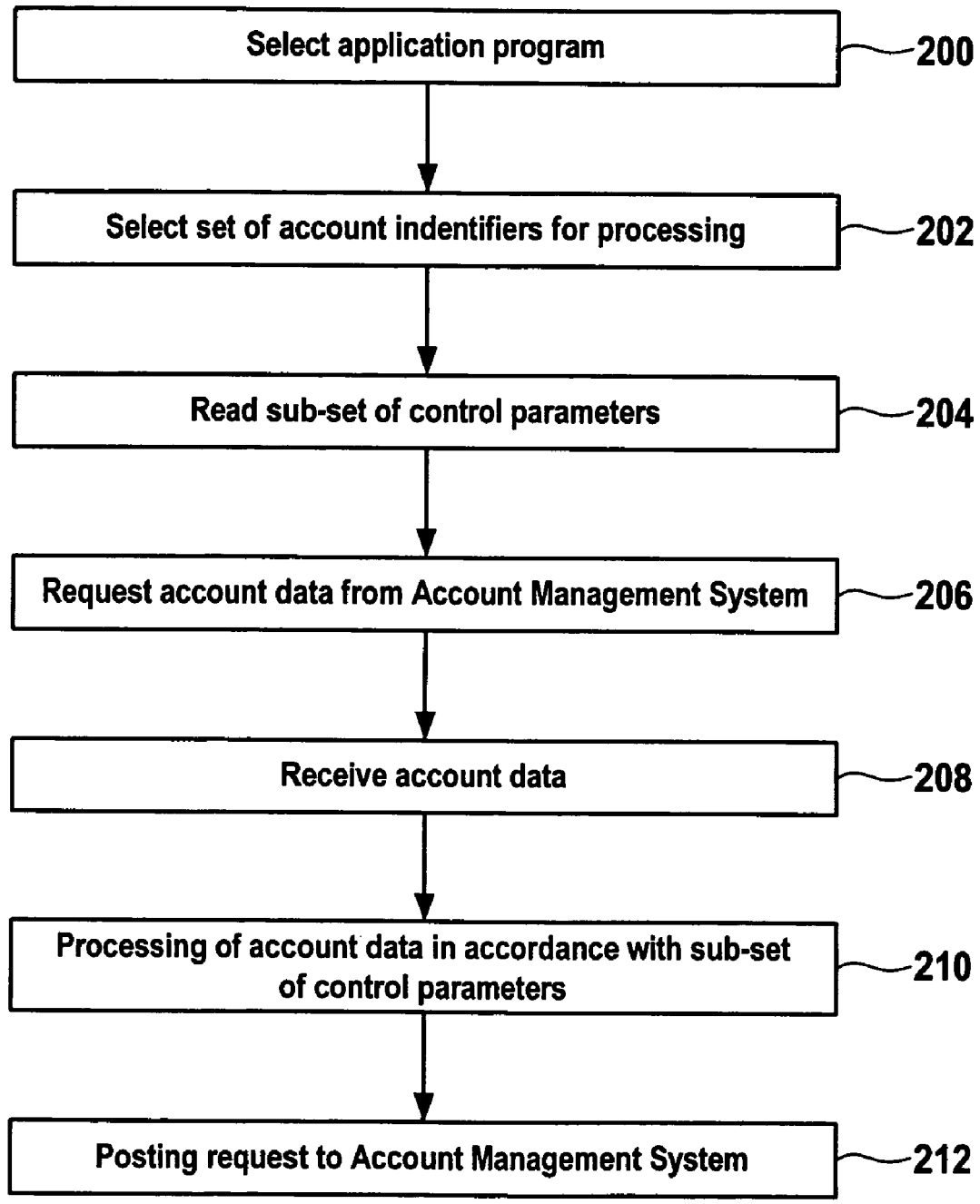
FIG. 2 is a flowchart illustrating an exemplary method, consistent with an embodiment of the present invention.

FIG. 2 shows a flowchart illustrating a exemplary method, consistent with an embodiment of the present invention. In step 200, one of the application programs of the data processing system is selected. This may be done either manually or automatically by a scheduler. Next, in step 202, a set of account identifiers is selected for processing. Typically, a large number of such sets of account identifiers may be selected either manually or automatically for mass processing of a large number of customer accounts.

Turning to step 204, the sub-set of control parameters that are related to the selected application program is read from the selected account identifier sets of the master data stored in a database, such as database 106 of FIG. 1. Next, in step 206, account data that is required for the performance of the data processing task of a selected application program is requested from the account management system.

In step 208, the requested account data is received. The account data is processed in accordance with the sub-set of the control parameters read in step 204 by the selected application program. As a result of the data processing performed by the selected application program, a number of posting requests are generated that are sent to the account management system in step 212 for immediate execution.

Selection of the account identifiers may be performed in accordance with specified due dates. The due date can be updated after having performed step 212 in order to indicate the due date of a consecutive processing. Alternatively, for the purposes of ODP, problematic accounts may be obtained from the account management system per an application program, such as ODP. For those problematic accounts, it is determined whether there are identified in master contracts. With respect to ODP, it is determined whether the problematic accounts are identified as funded accounts in one of the master contracts.

If application program A1 for performing an overdraft protection has been selected, the posting requests that are stored in the buffer memory of the account management system are also requested and transferred to the data processing system in order to make a determination whether the transfer of funds from funding accounts to funded accounts is required in order to avoid overdrafts.

FIG. 3 illustrates exemplary control parameters assigned to an account identifier set i. The account identifier set i includes a sub-set (A1) of the control parameters that is related to application program A1. The sub-set (A1) of the control parameters identifies funded accounts that are overdraft protected, funding accounts to provide required funds for the overdraft protection and a priority for each funding-funded relationship.

In the example of FIG. 3, account $a_{i1}$ may be marked as a funded account. Its funding account is account $a_{ij}$. The priority of the funding is "1." In other words, if funding account $a_{ij}$ has other funded accounts, the funding needs of funded account $a_{i1}$ are fulfilled with a high priority before funding is provided from funding account $a_{ij}$ to its other funded accounts having lower priority relationships with funding account $a_{ij}$. In a similar fashion, account $a_{ij}$ is marked as a funding account in the account identifier set i and its funded account is identified as account $a_{i1}$.

Furthermore, two different kinds of priorities may be specified. The first, a global priority, specifies an order for selecting a master contract for the performance of a mass activity run. The second priority specifies a sequence of processing within the sub-sets of the master contracts that have been selected for the mass activity run. Funding-funded relationships may be defined across different account identifier sets of different customers. For example, a husband and wife or the members of a family may want to define such funding relationships of their accounts. In addition the control parameters of the first type, i.e. account independent control parameters, are also included in the account identifier set as shown in FIG. 3.

Figure 4:
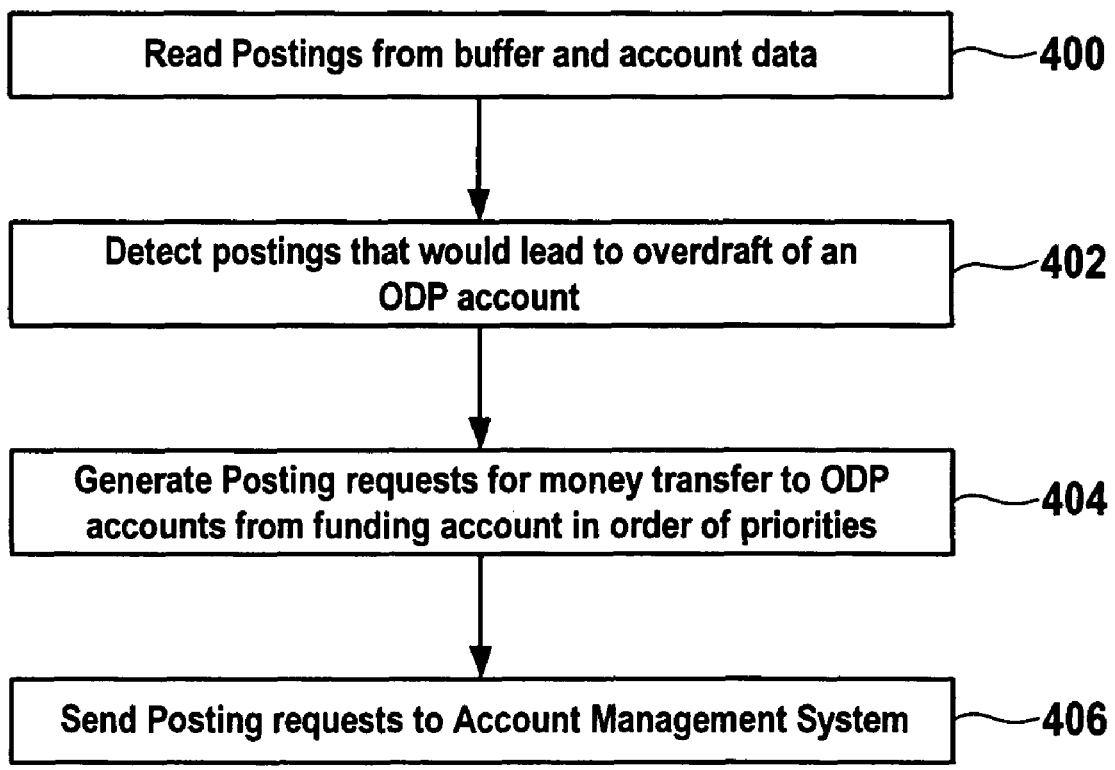
FIG. 4 is a flowchart illustrating an exemplary overdraft protection method, consistent with an embodiment of the present invention.

FIG. 4 is a flowchart of an exemplary overdraft protection method, consistent with an embodiment of the present invention. In step 400, posting requests that have been collected in the buffer memory during the posting day and relevant account data is read from the account management system and transferred to the data processing system for processing by application program A1 upon a respective request received by the account management system.

In step 402, application program A1 performs an analysis of the posting requests and the account data in order to identify overdraft protected accounts that require additional funds in order to prevent an overdraft. Furthermore, in step 402, a set of account identifiers can be selected for processing, especially the funding accounts. For the funding accounts, the account balance is read from the account management system in order to make a determination regarding the amount that can be transferred between the respective accounts.

Next, in step 404, posting requests are generated in order to transfer sufficient funds to overdraft protected accounts from funding accounts, if such funds are available. Furthermore, the amounts to be transferred may be determined such as by processing the account balances of the funding accounts, the amounts required by the funded accounts and the control parameters.

Alternatively, problematic accounts may be read from the account management system. Such functionality may be implemented by reading a buffer of the account management system or by a table that is delivered by the account management system containing the problematic accounts. With respect to the problematic accounts, it is determined if they are identified in master contracts. With respect to ODP, it is determined whether they are identified as a "funded account" in one of the master contracts.

In step 406, the posting requests are sent to the account management system and the due date for performing the next run can be updated.

Alternatively, only those sets are read that are defined for the application program that performs the ODP. The funded accounts may be determined within the selected sets. This corresponds to, for example, step 202 of FIG. 2.

Furthermore, the problematic accounts can be obtained from the account management system analogous to step 400. On this basis, the amounts to be transferred for the purpose of the ODP are determined analogous to step 404. Finally the next due date for performing the next ODP processing can be updated.

The posting requests may be generated in the order of the overdraft protection priorities in order to ensure that at least the highest priority overdraft protected accounts do have sufficient funds. For example, in step 406, the posting requests generated in step 404 are sent to the account management system for execution prior to execution of the posting requests that are buffered in the account management system.

Figure 5:
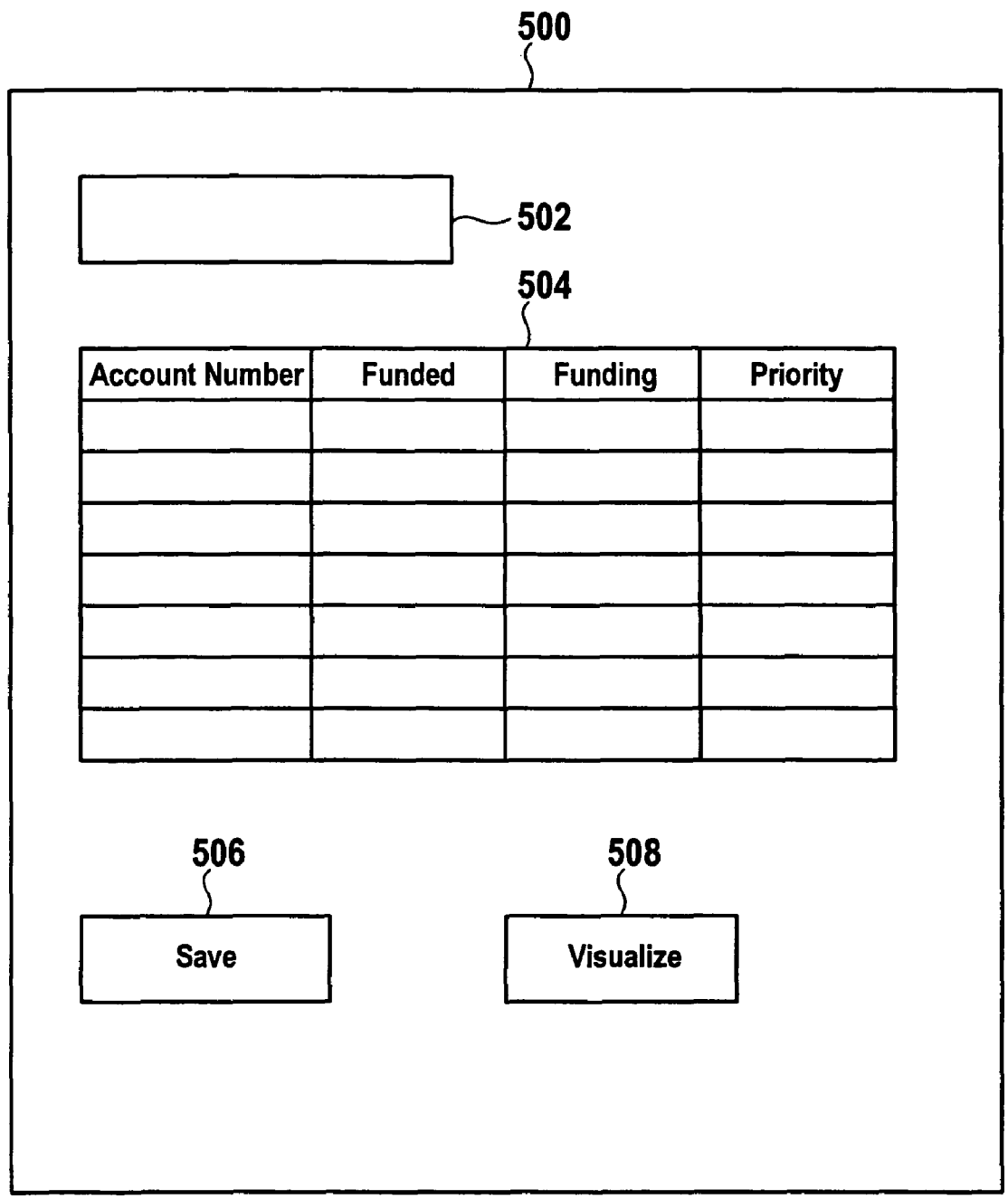
FIG. 5 illustrates an exemplary data entry window for entering control data specifying funded and funding accounts.

FIG. 5 shows an exemplary window 500 of a graphical user interface, such as GUI 124 of FIG. 1. Window 500 includes a data entry field 502 for entry of a customer name. Further, window 500 includes a table 504 for entry of an account identifier set for the customer. In the present example, table 504 may serve for specification of funding and funded accounts and the priority of the respective funded-funding relationship. Accordingly, an operator can enter the sub-set (A1) of the control parameters using table 504. Table 504 may include additional columns for other sub-sets of control parameters.

Further, window 500 includes a save button 506 for saving the account identifier set and the control parameters that have been entered into table 504. Window 500 may also include a button 508 that serves to invoke a visualization tool of the graphical user interface. The visualization tool serves to generate an intuitive display of the funded-funding relationships and their priorities that have been entered into table 504.

Figure 6:
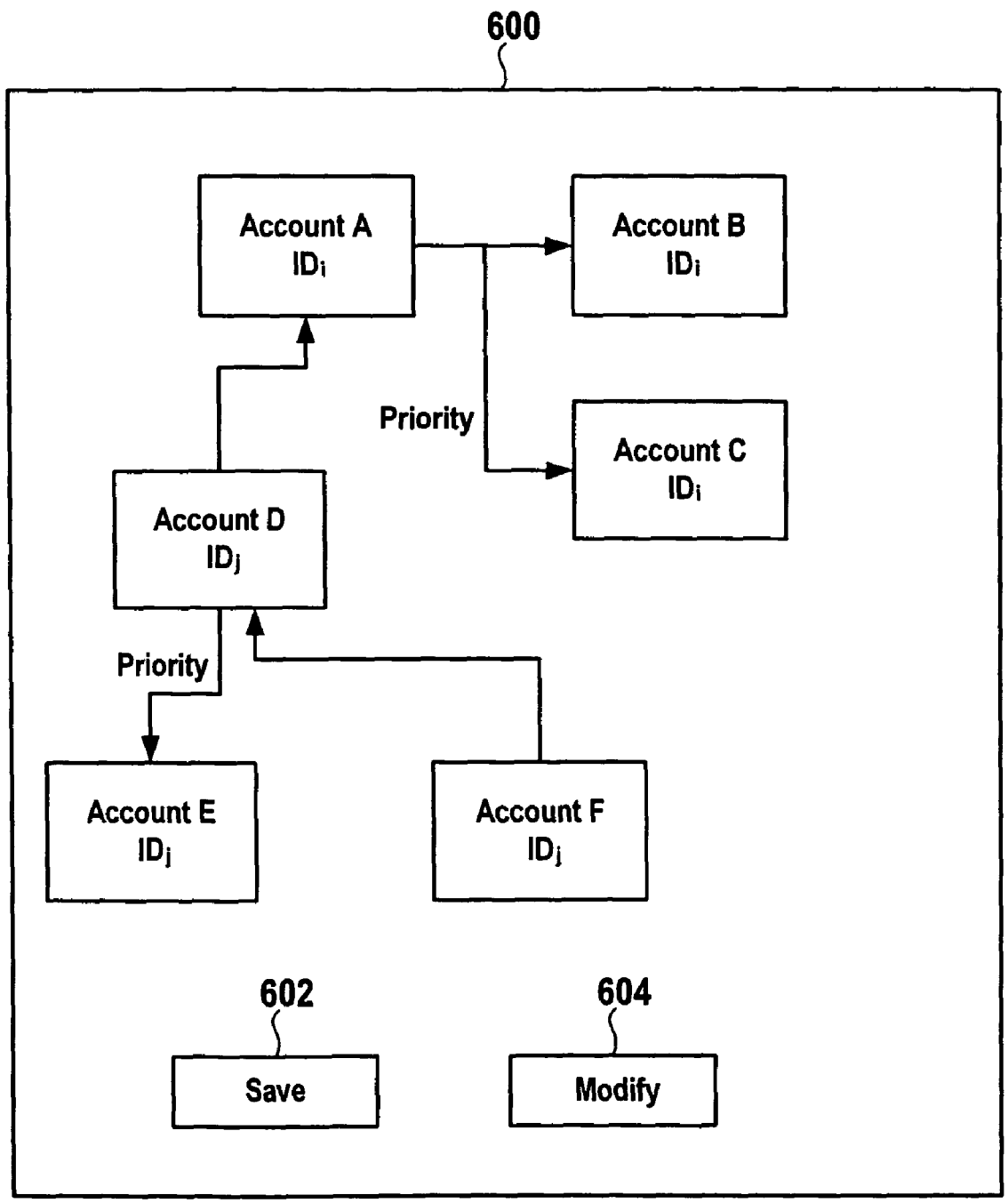
FIG. 6 illustrates an exemplary window that may be generated by a visualization tool.

FIG. 6 shows an exemplary window 600 that may be generated by the visualization tool for the customer i that has the identifier (ID) i. In the example of FIG. 6, there are only two priorities in which the highest priority relationship is visualized by the word "priority" displayed near an arrow that symbolizes the funding-funded relationship between two accounts. In this example, account A of the customer i is the funding account of account B and account C of the customer. The funding-funded relationship between account A and account C has the higher priority. The account B of another customer j is the funding account for account A of the customer i. Account D of the customer j is also the funding account of funded account E of the customer j in which the funding-funded relationship between account D and account E has the higher priority. Further, account F of the customer j is the funding account for the account D of the customer j.

Window 600 includes a button 602 for saving the funding-funded relationships displayed in the window 600 and their priorities. For modification, window 600 may also include a button 604. By clicking button 604, window 500 opens such that modifications of the funding-funded account relationships and their priorities may be entered.

Figure 7:
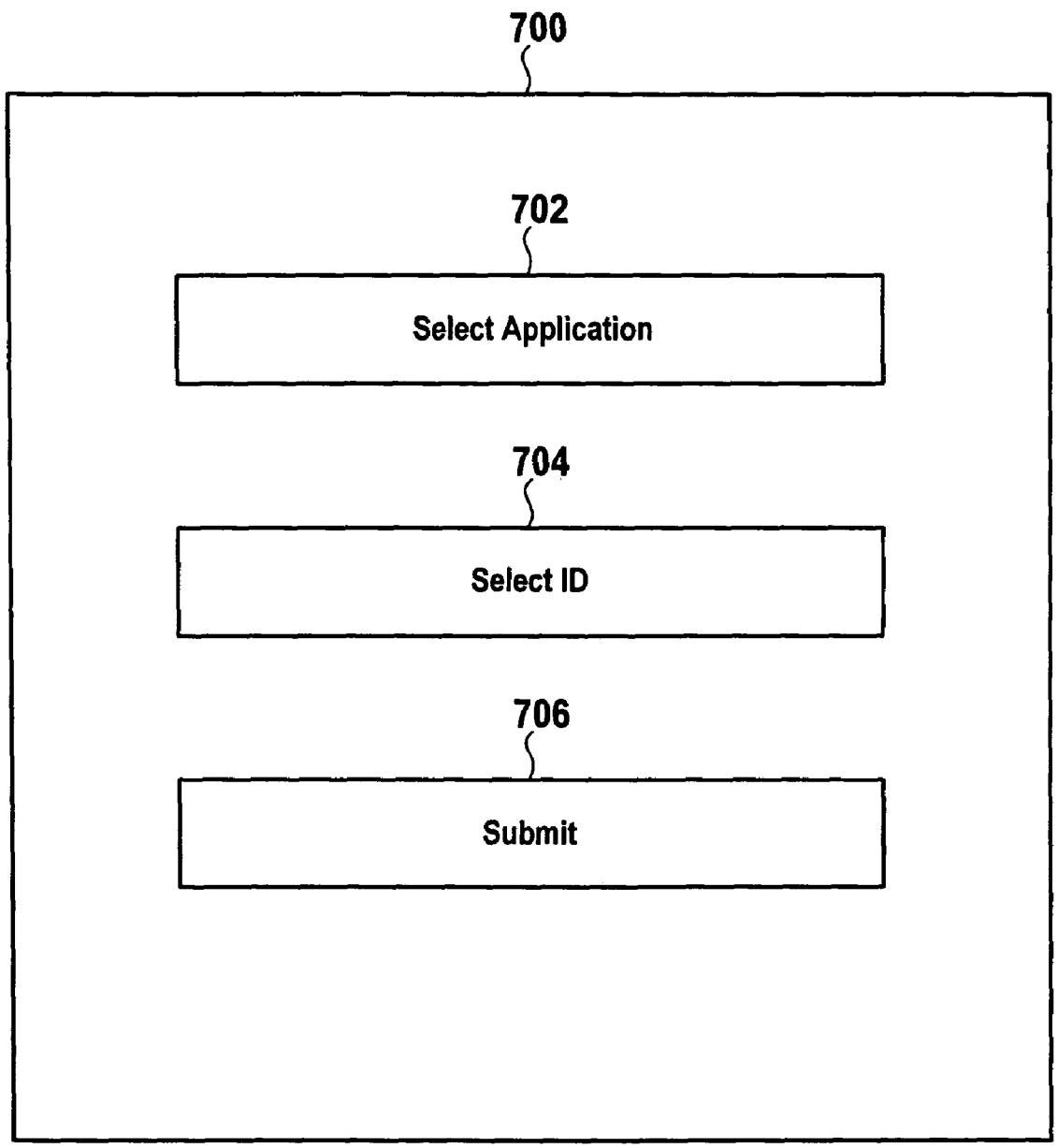
FIG. 7 is illustrates an exemplary window of a graphical user interface for initiating a mass activity.

FIG. 7 shows an exemplary window 700 of the graphical user interface that is related to the mass activity tool. Window 700 includes as data entry field 702 for selection of one of application programs A1, A2, A3, etc. of set 110. This may serve for selection of one of the application programs for performance of a mass activity run. Data entry field 704 of window 700 may provide entry of a customer selection. By means of data entry field 704, an operator may select those customers for which the selected mass activity run is to be performed. By clicking button 706, the operator can submit the specified mass activity run.

It is to be noted embodiments of the present invention are not limited to a particular financial or banking application, such as overdraft protection, bundle pricing and/or PDM, but may be used for various other financial and banking transactions that require the services of an account management system. Furthermore, it is to be noted that in embodiments of the present invention, the data processing system can be coupled to more than one account management system to use the account management services of those systems for implementation of the required financial and/or banking functionalities.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A data processing system, comprising:
storage means storing an account identifier identifying a customer account, the account identifier including a set of control parameters;
interface means coupled to an account management system that is separate from the data processing system, the account management system buffering postings to the customer account, the interface means receiving the buffered postings from the account management system; and an overdraft protection application program processing the buffered postings using the set of control parameters to determine an overdraft protection amount that would prevent an overdraft of the customer account, the overdraft protection application program being an upgrade to the account management system, wherein the set of control parameters is divided into sub-sets of control parameters that provide an overdraft protection functionality of the overdraft protection application program, wherein the overdraft protection application program generates an overdraft protection transfer request for the determined overdraft protection amount as a result of processing the buffered postings, and the interface means sends the overdraft protection transfer request to the account management system to credit the overdraft protection amount to the customer account before booking the buffered postings to prevent an overdraft of the customer account, and wherein the interface means receives the buffered postings from the account management system on request of the overdraft protection application program.

2. The data processing system of claim 1, wherein one of the sub-sets of control parameters comprises control parameters that cause the overdraft protection application program to implement the overdraft protection of the customer account.

3. The data processing system of claim 2, wherein the one of the sub-sets of control parameters specifies at least one funded account and at least one funding account, wherein the overdraft protection application program implements the overdraft protection for the funded account by the funding account.

4. The data processing system of claim 3, wherein an overdraft protection relationship between the funded account and the funding account has an assigned priority.

5. The data processing system of claim 4, further comprising:
a visualization program component for visualizing the overdraft protection relationship between the funded account and the funding account.

6. The data processing system of claim 1, wherein the account management system includes a buffer that buffers the incoming postings received from a posting source, and transfers the buffered postings to the data processing system for processing prior to booking the buffered postings on the customer account, wherein the transfer of the overdraft protection amount to the customer account provides overdraft protection.

7. The data processing system of claim 1, further comprising:
a mass activity tool for mass processing of a plurality of account identifiers by the overdraft protection application program.

8. A data processing method, comprising:
selecting, by a data processing system, an account identifier identifying a customer account, from a plurality of account identifiers, each of the account identifiers including a set of control parameters;
requesting postings of the customer account from an account management system that is separate from the data processing system, the account management system buffering the postings in a computer memory;
processing, by a computer processor executing an overdraft protection application program, the buffered postings in accordance with the set of control parameters assigned to the account identifier to determine an overdraft protection amount that would prevent an overdraft of the customer account and to generate an overdraft protection transfer request for the determined overdraft protection amount, the overdraft protection application program being an upgrade to the account management system, wherein the set of control parameters is divided into sub-sets of control parameters that provide an overdraft protection functionality of the overdraft protection application program; and
transmitting the overdraft protection transfer request to the account management system to credit the overdraft protection amount to the customer account before booking the buffered postings to prevent an overdraft of the customer account.

9. The data processing method of claim 8, wherein one of the sub-sets of control parameters comprises control parameters that cause the overdraft protection application program to implement the overdraft protection of the customer account.

10. The data processing method of claim 9, wherein the control parameters specify at least one funded account and at least one funding account, overdraft protection for the funded account being provided by means of the funding account, the method further comprising:
generating a posting request for performing a money transfer from the funding account to the funded account.

11. The data processing method of claim 10, wherein a relationship between the funded account and the funding account is assigned a priority, and wherein the posting request for transferring money from the funding account to the funded account are generated in accordance with the priority assigned to the relationship.

12. The method of claim 8, wherein the postings are buffered in a buffer of the account management system and transferred for processing by the overdraft protection application program prior to booking the buffered postings on the customer account held in the account management system.

13. A computer readable storage medium comprising computer executable instructions for performing a data processing method, the method comprising:
selecting, by a data processing system, an account identifier identifying a customer account, from a plurality of sets of account identifiers, each of the sets of account identifiers including a set of control parameters;
requesting buffered postings of the customer account from an account management system that is separate from the data processing system, the account management system buffering the postings in a computer memory;
processing, using an overdraft protection application program, the buffered postings in accordance with the set of control parameters assigned to the account identifier to determine an overdraft protection amount that would prevent an overdraft of the customer account and to generate an overdraft protection transfer request for the determined overdraft protection amount, the overdraft protection application program being an upgrade to the account management system, wherein the set of control parameters is divided into sub-sets of control parameters that provide an overdraft protection functionality of the overdraft protection application program; and
transmitting the overdraft protection transfer request to the account management system to credit the overdraft protection amount to the customer account before booking the buffered postings to prevent an overdraft of the customer account.

* * * * *